No. 705,361. Patented July 22, 1902.
J. KLEIN.
CREAM SEPARATOR AND CHURN.
(Application filed May 24, 1902.)
(No Model.)
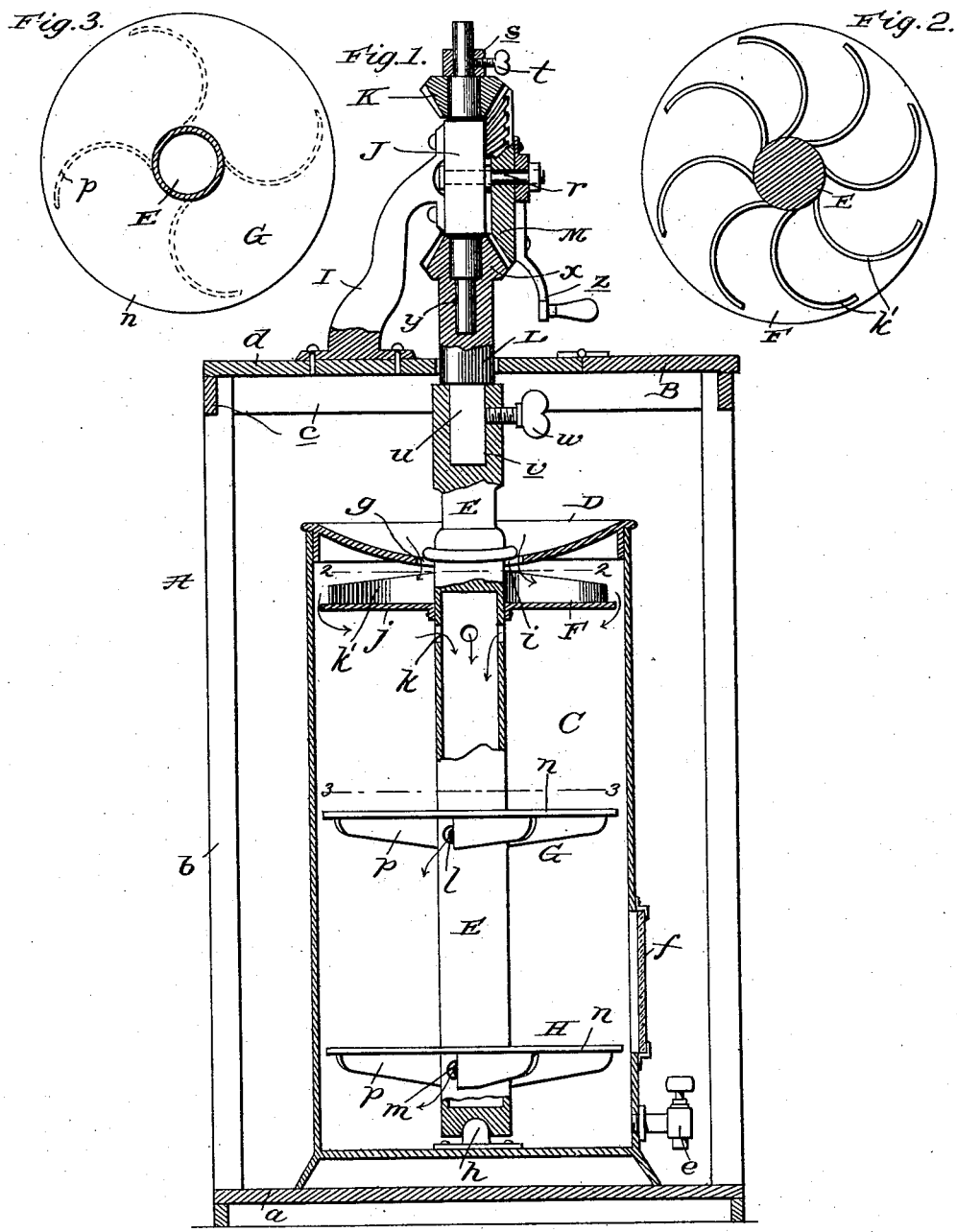
Witnesses
Inventor
Joseph Klein.
By James J. Shuhy
Attorney

UNITED STATES PATENT OFFICE.

JOSEPH KLEIN, OF CASS CITY, MICHIGAN, ASSIGNOR OF ONE-HALF TO WILLIAM FERGUSON, OF CASS CITY, MICHIGAN.

CREAM-SEPARATOR AND CHURN.

SPECIFICATION forming part of Letters Patent No. 705,361, dated July 22, 1902.

Application filed May 24, 1902. Serial No. 108,834. (No model.)

*To all whom it may concern:*

Be it known that I, JOSEPH KLEIN, a citizen of the United States, residing at Cass City, in the county of Tuscola and State of Michigan, have invented new and useful Improvements in Cream-Separators and Churns, of which the following is a specification.

My invention relates to improvements in churns; and it consists in the peculiar and advantageous cream-separator and churn hereinafter described, and particularly pointed out in the claims appended.

In the accompanying drawings, Figure 1 is a vertical section of my improved cream-separator and churn. Fig. 2 is a detail section taken in the plane indicated by the broken line 2 2 of Fig. 1 and illustrating the upper dasher, which serves the additional function of drawing atmospheric air into the can; and Fig. 3 is a detail section taken in the plane indicated by the broken line 3 3 of Fig. 1 and illustrating one of the lower dashers, which serve, in addition to agitating the milk and cream, to draw air through the hollow dasher-shaft into the same.

Similar letters of reference designate corresponding parts in all of the views of the drawings, referring to which—

A is the main frame of my cream-separator and churn, which preferably comprises a base *a*, corner-uprights *b*, and upper horizontal bars *c* and is by preference surmounted by a top B, having a leaf *d*, hinged in such manner as to permit of it being raised and lowered, and C is the can. This can is arranged on the base *a* of the frame A and is preferably provided with a draw-off cock *e* and a sight-glass *f*. It is also provided with a removable cover D, which is preferably concavo-convex in form and arranged with its convex side down and is provided with a central aperture *g*.

E is hollow shaft mounted at its lower end on a bearing-stud *h*, connected to the bottom of the can and extending loosely through the opening *g* in cover D, so that a space *i* is afforded between it and the wall of the opening for the passage of air into the can. The shaft, which is preferably removable from the can, is provided immediately below the cover D with a dasher F, made up of a flat horizontal disk *j* and vertical curvilinear blades *k'*, Figs. 1 and 2, arranged on said disk. It is also provided at intermediate points of its height with apertures *k*, *l*, and *m* and adjacent to the apertures *l* and *m* with dashers G H, respectively. These dashers respectively comprise a flat horizontal disk *n*, disposed slightly above the apertures, and vertical curvilinear blades *p*, arranged at the under side of the disk.

I is a standard connected to and rising from the leaf *d* of cover B; J, a vertically-disposed post fixedly connected to said standard and having upper and lower portions of circular form in cross-section and also having a lateral journal *r*; K, a beveled idler-pinion mounted on the upper circular portion of post J and secured in position by a collar *s* and set-screw *t*; L, a shaft having a lower end portion *u* of angular form in cross-section removably secured in a corresponding socket *v* in the upper end of the dasher-shaft E by a set-screw *w* and also having a beveled pinion *x* at its upper end and a socket *y* in said end receiving the lower end portion of post J, and M a miter-gear mounted on the journal *r* and intermeshed with the pinions K and *x* and provided with a crank *z*. As before stated, the pinion K is an idler-pinion, its sole purpose being to prevent lateral play of the gear M, with a view of holding said gear at all times in proper engagement with the pinion *x* of the shaft L.

It will be appreciated from the foregoing that when the set-screw *w* is loosened the leaf *d* may be swung upwardly toward the right to carry shaft L out of engagement with the dasher-shaft E; also, that when the leaf and the parts carried thereby are in the raised position the cover D may be readily removed from can C and as readily replaced thereon. In using the apparatus the milk or cream is preferably poured in the can C while the cover D is removed, and the cover is then replaced and the parts returned to and secured in the positions shown in Fig. 1, when the apparatus will be ready for operation.

When the apparatus is used as a cream-separator and the shaft E is rotated, the dashers F, G, and H will serve to thoroughly agitate the milk. The dasher F will also serve to draw atmospheric air into the can through the space $g$, while the dashers G H will perform the additional function of drawing such air into the shaft through the apertures $k$ and down through the shaft and the apertures $l$ $m$ into the milk, with the result that the milk will be aerated and cooled and the separation of the cream materially accelerated. When the apparatus is used as a churn, the cream will be agitated and aerated and cooled, as stated, and in consequence butter will be quickly produced.

When the shaft L is disconnected from the dasher-shaft E and the leaf $d$ is swung upwardly toward the right, the dasher-shaft may obviously be readily removed from the can with a view of facilitating cleaning of the can, dasher-shaft, and can-cover.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. In an apparatus for the purpose described, the combination of a can having a cover provided with an opening for the admission of air, an upright, hollow shaft arranged in the can, and having an opening adjacent to the cover for the admission of air and an opening, below said inlet-opening, for the exit of air, a dasher arranged on said shaft above the air-inlet opening thereof, and comprising a flat horizontal disk, and curvilinear blades on the upper side of the same, and a dasher arranged on the shaft adjacent to the air-exit opening, and comprising a flat, horizontal disk, and curvilinear blades on the under side of the same.

2. In an apparatus for the purpose described, the combination of a can having a cover provided with an opening for the admission of air, an upright hollow shaft arranged in the can, and having an opening adjacent to the cover for the admission of air, and an opening, below said inlet-opening, for the exit of air, a combined dasher and air-suction device arranged on said shaft above the air-inlet opening thereof and below the air-inlet opening in the can-cover, and a combined dasher and air-suction device arranged on the shaft adjacent to the air-exit opening thereof.

In testimony whereof I have hereunto set my hand in presence of two subscribing witnesses.

JOSEPH KLEIN.

Witnesses:
BERNHARD KUHN,
J. C. LAING.